(12) United States Patent
Madkour et al.

(10) Patent No.: US 7,802,228 B2
(45) Date of Patent: Sep. 21, 2010

(54) SYSTEMS AND METHODS FOR VARYING SOFTWARE BUILD PROPERTIES USING PRIMARY AND SUPPLEMENTAL BUILD FILES

(75) Inventors: Tarek Madkour, Sammamish, WA (US); Shankar Vaidyanathan, Sammamish, WA (US); Joshua Christopher Shepard, Seattle, WA (US); Peter Christian Huene, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 10/922,025

(22) Filed: Aug. 19, 2004

(65) Prior Publication Data

US 2006/0041870 A1 Feb. 23, 2006

(51) Int. Cl.
*G06F 9/44* (2006.01)
(52) U.S. Cl. .............. 717/103; 717/105; 717/107; 717/111; 717/121
(58) Field of Classification Search .......... 715/762, 715/825, 826, 845; 719/328, 316; 717/105, 717/109, 125
See application file for complete search history.

(56) References Cited

U.S. PATENT DOCUMENTS

| | | | | |
|---|---|---|---|---|
| 5,600,778 | A * | 2/1997 | Swanson et al. | 715/762 |
| 5,867,163 | A * | 2/1999 | Kurtenbach | 715/840 |
| 5,953,525 | A * | 9/1999 | Glaser et al. | 717/105 |
| 6,182,279 | B1 * | 1/2001 | Buxton | 717/100 |
| 6,195,794 | B1 * | 2/2001 | Buxton | 717/108 |
| 6,376,068 | B1 | 4/2002 | Garcia-Ramirez et al. | 428/343 |
| 6,417,872 | B2 | 7/2002 | Zimmerman et al. | 345/777 |
| 6,487,713 | B1 * | 11/2002 | Cohen et al. | 717/105 |
| 7,290,243 | B1 * | 10/2007 | Bertelrud et al. | 717/107 |
| 7,428,726 | B1 * | 9/2008 | Cowan et al. | 717/122 |
| 7,596,782 | B2 * | 9/2009 | Ebbo et al. | 717/141 |
| 2003/0009740 | A1 * | 1/2003 | Lan | 717/102 |
| 2003/0182650 | A1 * | 9/2003 | Smith | 717/106 |
| 2004/0002991 | A1 | 1/2004 | Bogdan et al. | 707/102 |
| 2004/0015819 | A1 * | 1/2004 | Romano-Critchley et al. | 717/102 |

(Continued)

OTHER PUBLICATIONS

Sarkar, V., "Optimized Execution of Fortran 90 Array Language on Symmetric Shared-Memory Multiprocessors," *Languages and Compilers for Parallel Computing. 11th International Workshop, LCPC'98*, Chapel Hill, North Carolina, Aug. 7-9, 1998, 131-147.

(Continued)

*Primary Examiner*—Tuan Q Dam
*Assistant Examiner*—Isaac T Tecklu
(74) *Attorney, Agent, or Firm*—Woodcock Washburn LLP

(57) ABSTRACT

A primary file can be used to specify default build properties for software under development. A set of modified build properties may be stored in a supplemental file. The default build properties can be temporarily overridden with modified build properties for a given build, allowing freedom in the choice of build properties without proliferation of files used for the same purpose, which can be confusing. In addition, users can create new build commands for software under development, and associate the new commands with supplemental files. When the user invokes a new build command, the build process can override the default properties with the modified properties in the supplemental file, and then restore the defaults. Other advantages and features of the invention are described below.

24 Claims, 9 Drawing Sheets

U.S. PATENT DOCUMENTS

| | | | |
|---|---|---|---|
| 2004/0031016 A1 | 2/2004 | Vaidyanathan et al. | 717/110 |
| 2004/0031017 A1 | 2/2004 | Vaidyanathan et al. | 717/110 |
| 2004/0073889 A1* | 4/2004 | Baecker et al. | 717/121 |
| 2004/0088679 A1* | 5/2004 | Grala | 717/110 |
| 2004/0111696 A1* | 6/2004 | Soroker et al. | 717/101 |
| 2004/0261053 A1* | 12/2004 | Dougherty et al. | 717/101 |
| 2004/0268301 A1* | 12/2004 | Kaston | 717/108 |
| 2005/0034120 A1* | 2/2005 | Fisher et al. | 717/175 |
| 2005/0114475 A1* | 5/2005 | Chang et al. | 709/220 |
| 2005/0262481 A1* | 11/2005 | Coulson | 717/120 |
| 2005/0278579 A1* | 12/2005 | Hill et al. | 714/38 |

OTHER PUBLICATIONS van Ommering, R., "Configuration Management in Component Based Product Populations," *Software Configuration Management. ICSE Workshops SCM 2001/2003*, Toronto, Ontario, Canada, May 14-15, 2001, and Portland, Oregon, May 9-10, 2003, 16-23.

U.S. Appl. No. 10/768,522, filed Jan. 30, 2004, Yukenewicz et al.

\* cited by examiner

SYSTEMS AND METHODS FOR VARYING SOFTWARE BUILD PROPERTIES USING PRIMARY AND SUPPLEMENTAL BUILD FILES

FIELD OF THE INVENTION

This invention relates to software development, and more particular to the automated preparation of executable files, and further to the management of files that are used to specify properties of the executable files that are generated in such automated preparation.

BACKGROUND OF THE INVENTION

Modern software is typically created with a great deal of computer automated assistance. Such assistance is commercially available in a variety of software, generally referred to as integrated development environments (IDEs). For example, MICROSOFT'S VISUAL STUDIO®, BORLAND'S C++ BUILDER®, METROWERK'S CODE WARRIOR®, and IBM'S WEBSPHERE STUDIO® are all products presently available to assist in software creation. Such products provide a range of useful functions, such as coordinating communications between multiple developers working together on large projects, assisting in the actual writing of source code, assisting in specifying how a source code file will be compiled, and providing compilers and other processes that convert a source code files and the like into executable files.

The process of developing software using an IDE is depicted in FIG. 1a. First, the software can be designed using a design tool 100. The design tool 100 will typically provide a wide range of design functions for generating any number of files 110a-110h. Files 110a-110h may be files of a variety of types. Some may be files containing source code, while others are files that specify some other properties of the software under development. When the files 110a-110h for a software application are ready, they may be passed to what is known as a build process 120. Many IDEs have built-in build processes 120. While some IDE products may bifurcate the creation of the files 110a-110h and the build-process 120, others provide software design and build as options through a single user interface.

The build process 120 may comprise any number of sub-processes 121-124. One such sub-process is typically a compiler 121. A compiler 121 is software that provides a function of reading source code and generating binary files, which may be computer-executable, or near-computer-executable files. Compilers may provide this function in any number of different ways, leading ultimately to differences in the computer executable files that are generated. Moreover, compilers 121 may provide a plurality of options that allow a user to specify properties of the output executable files 145, 146, 147. For example, a user may wish to compile executable files that are as small in disk size as possible. Other users may not care about disk size, and may care instead about performance. Source code and other files can also be compiled to optimize performance. A host of other options allowing users to control the properties of executable files are available through modern compilers. These properties may be stored in one or more files 131-134 available to the build process 120. Thus, when the time comes to convert the original files 110a-110h into executable files 145, 146, 147, the build process has access to the build property files 131-134 governing how the build is to be conducted.

Similarly, the other sub-processes 122-124 may provide options regarding how the original files 110a-110h are converted into executable files 145, 146, 147. A host of such sub-processes are available through modern IDEs, and many offer multiple build options. The result is that a build properties file, e.g. 131 may provide a large number of build option selections.

A solo developer may run an IDE on a personal computer, and perform all of the above steps on a single machine. In another scenario, a team of developers may work together on an application. In this scenario, the network of collaborating developers may look similar to FIG. 1b.

As suggested by the FIG. 1b, a central server 150 may be used to coordinate the efforts of a number of developers using client devices 149, 155, 160, 165. The developers may each have a variety of responsibilities in implementing aspects of a large software application. It is important that the various aspects of software work together properly. It is also preferable to ensure centralized control over a software application, so that developers cannot inadvertently alter the application without approval through the proper channels. Without such centralized control, the development environment can quickly become one in which there are many copies of an application, each with differing features, and it becomes impossible to move forward with production.

Thus the central server 150 is frequently called a "Source Code Control" (SCC) engine 150. The means by which most SCC engines 150 coordinate development is through sync and check-in procedures. When a developer first retrieves existing software under development from the SCC engine 150, it is called a sync 151. A sync 151 creates a copy of the application on the developer's client computer 149. This provides the developer with an official copy of the application under development, so he or she can work with the existing features of the application. A check-in 152 occurs when the developer returns his or her modifications to the SCC engine 150; and thereby updates the official version of the application under development. A set of modifications may be subject to review prior to check-in 152. If the modifications made by a developer conflict with other modifications, then the modifications may have to be scrapped.

In both the scenario of a solo developer and that of the team of collaborating developers, the proliferation of files can be a problem. Referring back to FIG. 1a, consider the problems that can occur if multiple files 131, 132, 133 are kept for the purpose of using a different set of build options in various builds of executable files 145, 146, 147. First, where possibly hundreds of options are specified, a problem arises as to which file contains which option selections. A set of options may have been determined, but those working on the software may not remember all of the considerations that went into the choice. If the file containing the "official" build selections, e.g. 131, is not properly tracked, it could be confused with other build options files 132, 133. This could require redundant consideration of issues already addressed, at considerable expense.

Second, a problem arises when multiple builds of software applications, and portions of applications, are made using multiple build options files 131, 132, 133. The use of differing build options is often desired for the purpose of testing the software being developed in various configurations. However, a build options file 131 used for a particular executable file, e.g. 145, may not be remembered. Thus, if a bug is found in a particular executable file 145, but the build options are not known, the bug may be more difficult or impossible to investigate. Likewise, if a particular build 145 solves a number of problems, but the build options file 131 that was used is not known, then it may be impossible to repeat or examine the reason for the new behavior.

In light of the above described deficiencies in the art, there is a need in the industry to provide systems and methods to better manage build options files in of software development.

SUMMARY OF THE INVENTION

In consideration of the above-identified shortcomings of the art, the present invention provides systems and methods for building computer executable files with a specific set of build options, or build properties, without modifying a primary file used to specify default build properties for the software under development. A set of modified build properties may be stored in a supplemental file. The default build properties can be temporarily overridden by the modified build properties. In addition, users can create new build commands for software under development, and associate the new commands with supplemental files. When the user invokes a new build command, the build process can override the default properties with the modified properties in the supplemental file, and then restore the defaults. Other advantages and features of the invention are described below.

BRIEF DESCRIPTION OF THE DRAWINGS

The systems and methods for varying software build properties using primary and supplemental build files in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 2A:
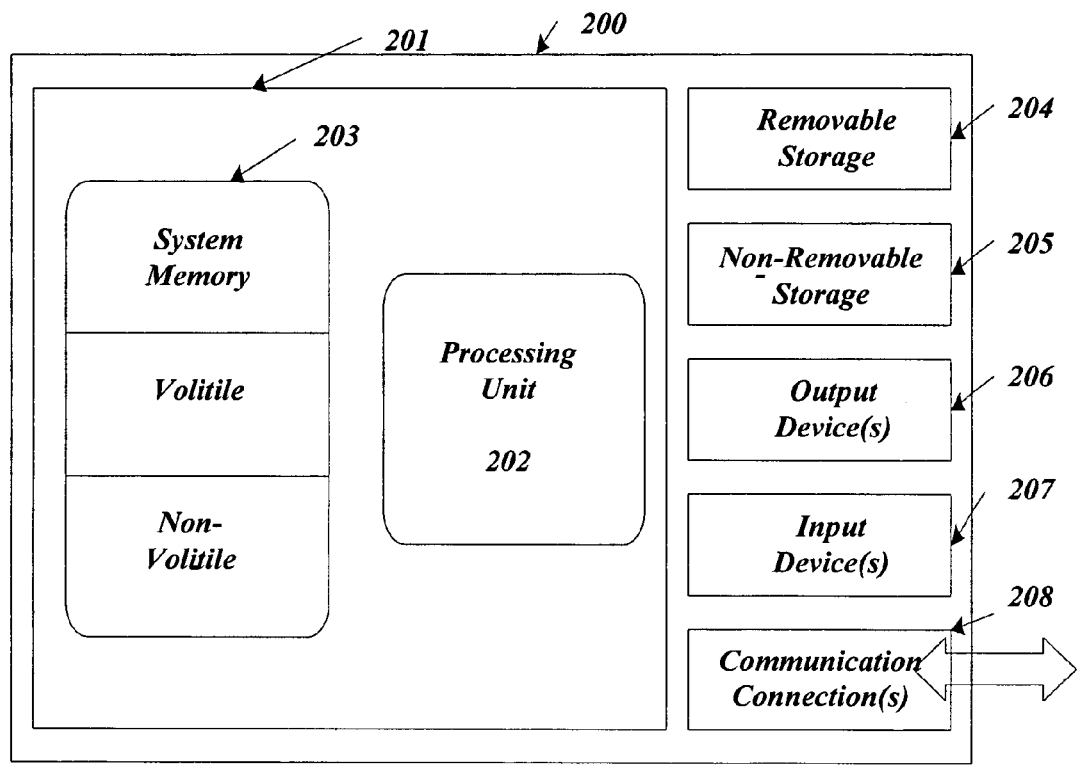
FIG. 2a is a block diagram broadly representing the basic features of an exemplary prior art computing device suitable for use in conjunction with various aspects of the invention.
Figure 2B:
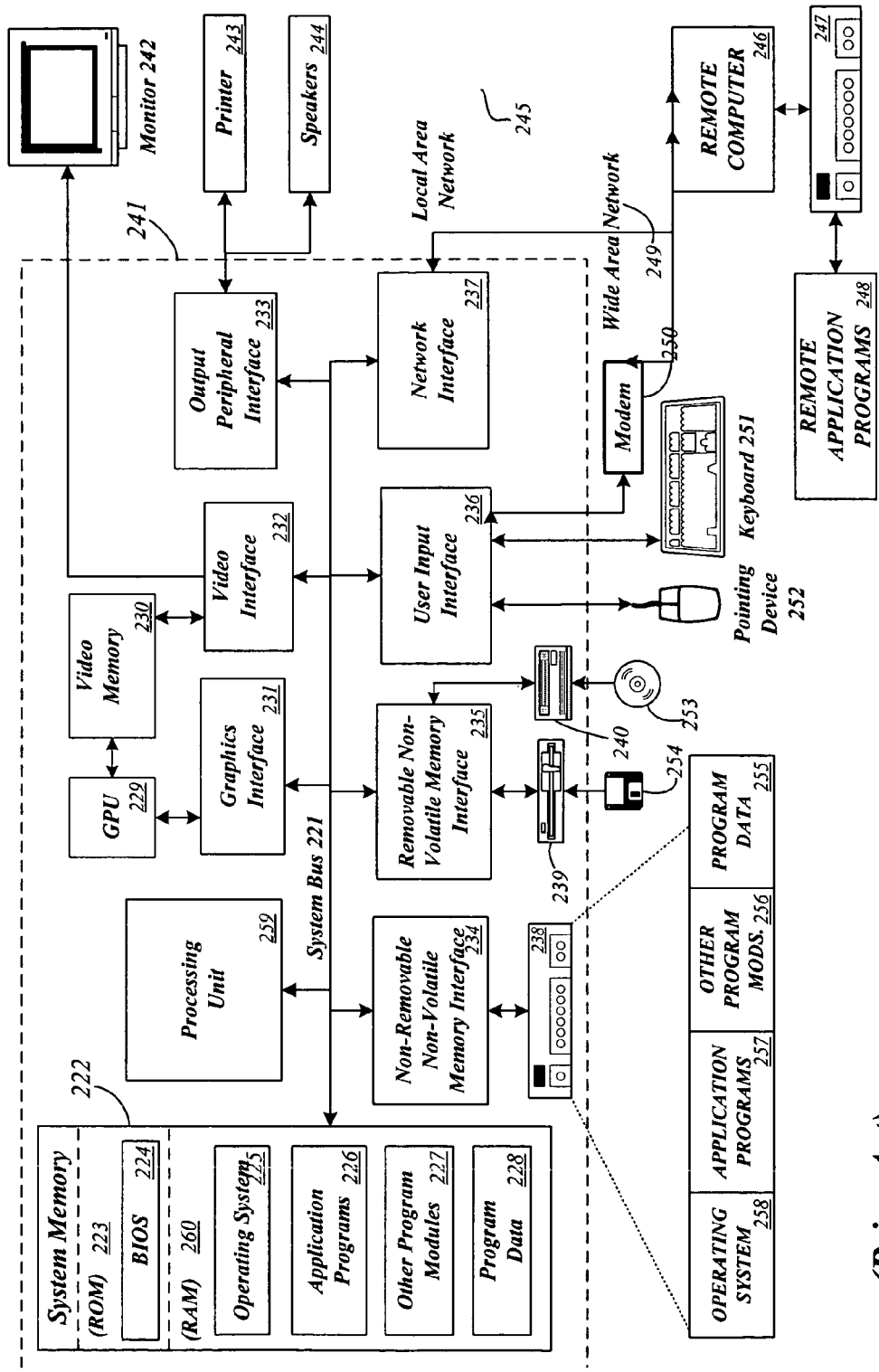
FIG. 2b is a block diagram representing a more detailed exemplary prior art computing device suitable for use in conjunction with various aspects of the invention.
Figure 2C:
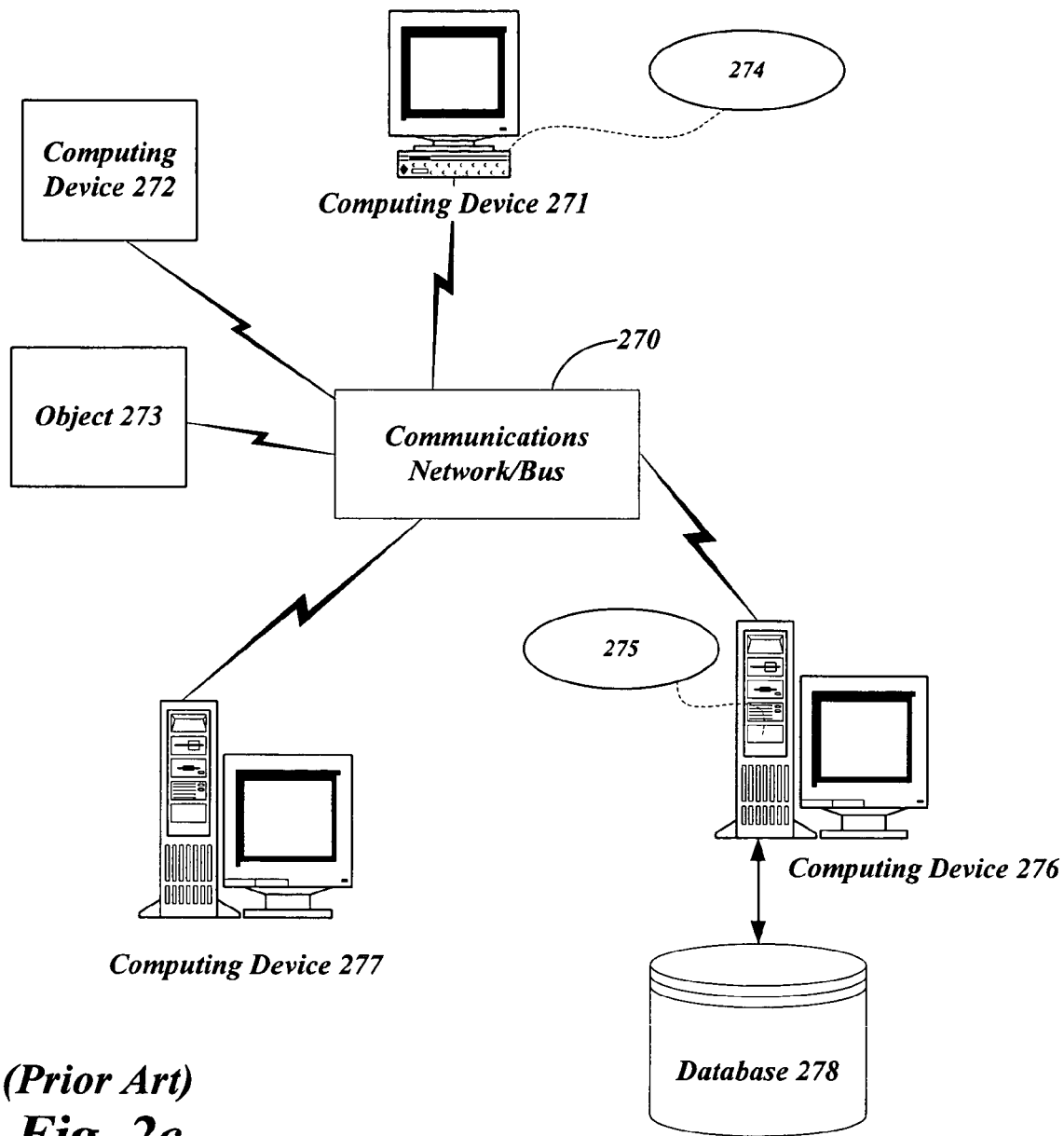
FIG. 2c illustrates an exemplary prior art networked computing environment in which may computerized processes, including those of the invention, may be implemented.
Figure 3:
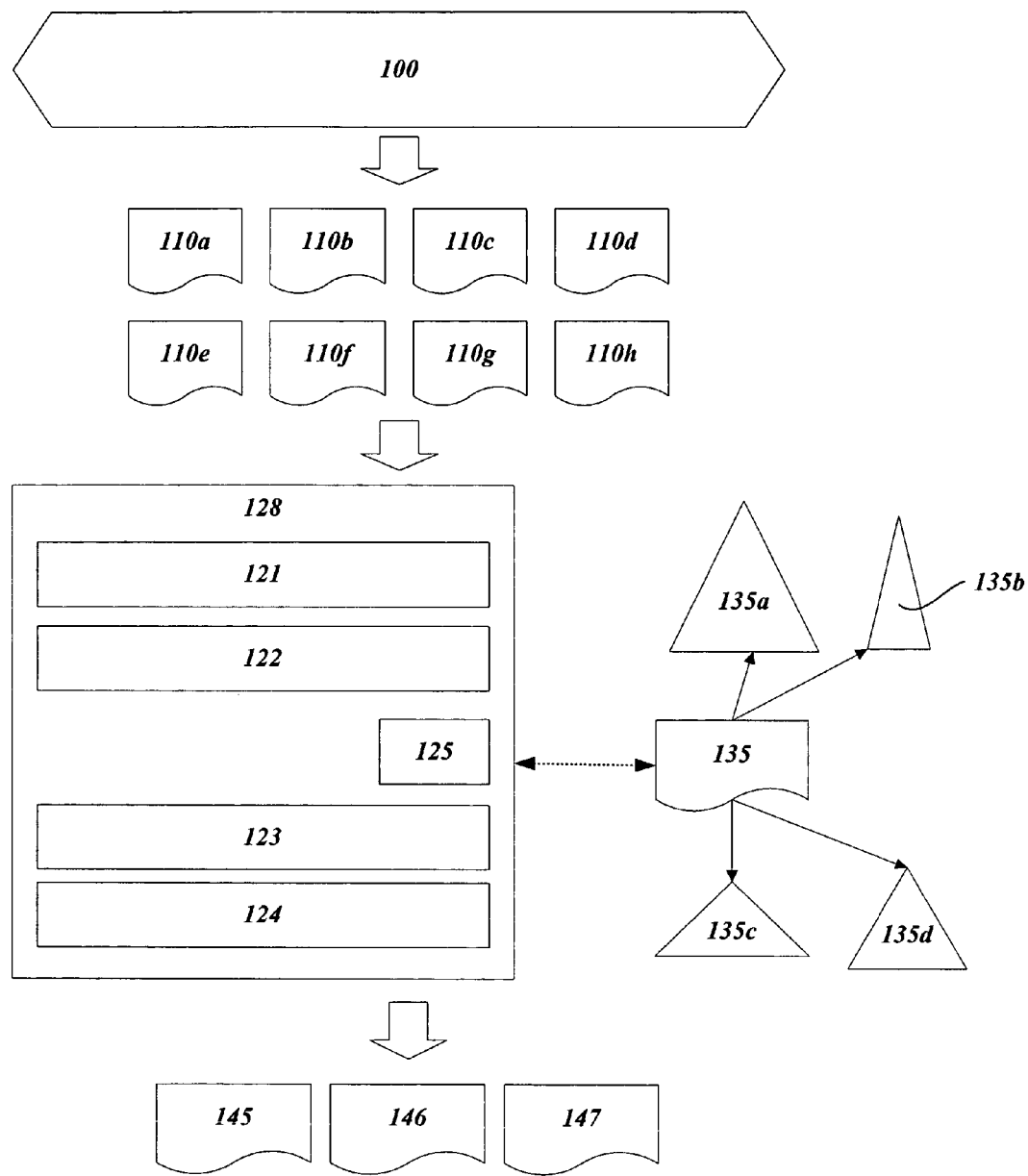
FIG. 3 illustrates a software development process in which the build process can make use of a primary file bearing a first set of build properties, and any number of supplemental files bearing second sets of build properties that can be combined with the primary file by an additional build sub-process.
Figure 4:
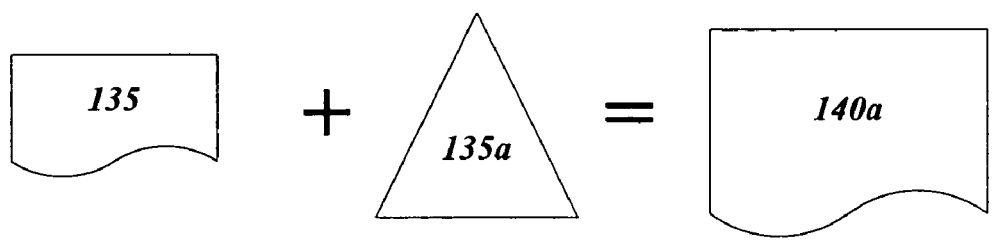
FIG. 4 illustrates the combination of a primary file with various supplemental files to create unique new sets of build properties.
Figure 4:
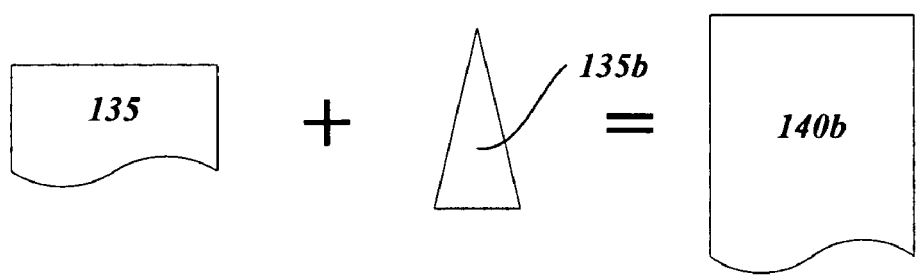
Figure 4:
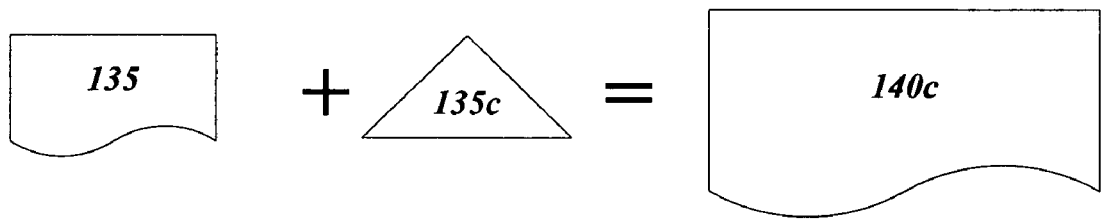
Figure 4:
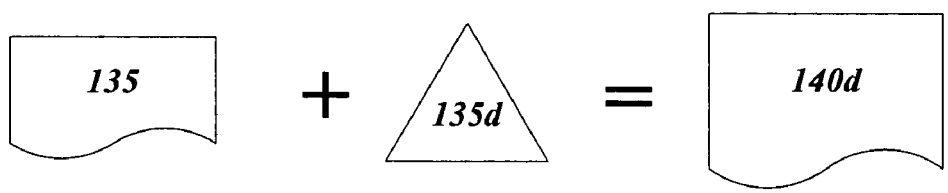
Figure 5:
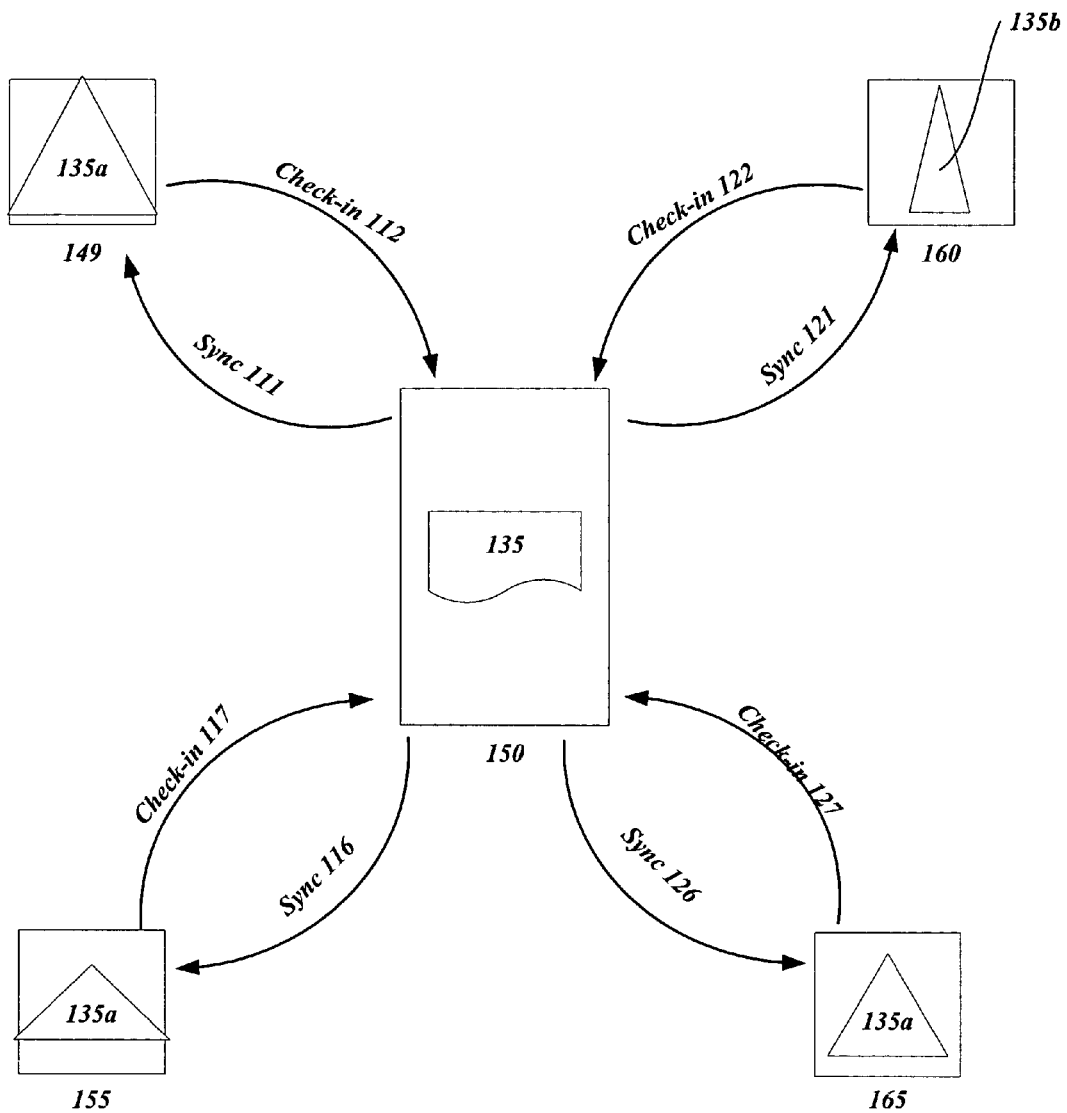
FIG. 5 illustrates a collaborative software development environment in which a plurality of software developers coordinate their efforts through a central server. Each developer may cause several builds of software under development for his or her own purposes, using different sets of build properties that are reflected in supplemental files and therefore present no risk of replacing or being confused with the properties agreed upon for official builds of the software.
Figure 6:
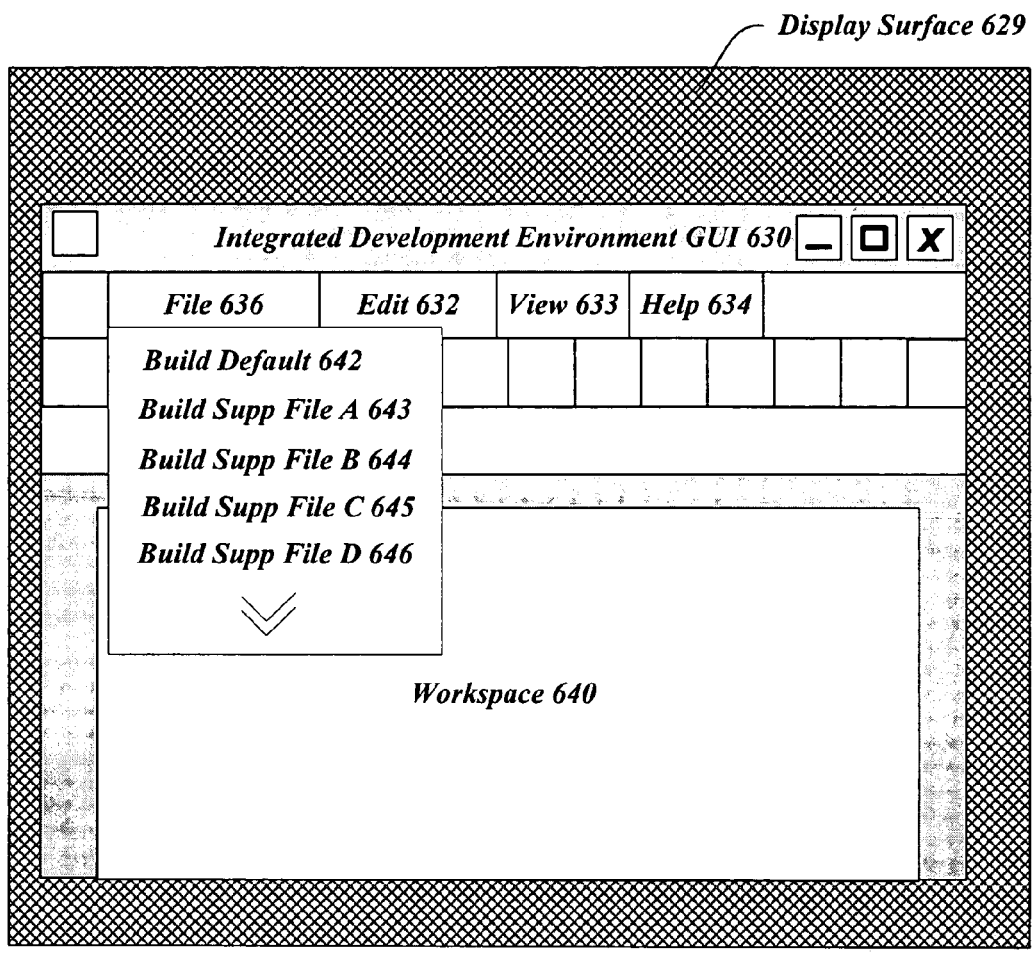
FIG. 6 illustrates an IDE GUI with a plurality of build selections for building software with different build properties. The various build selections correspond to combinations of a primary file with various supplemental files.
Figure 7:
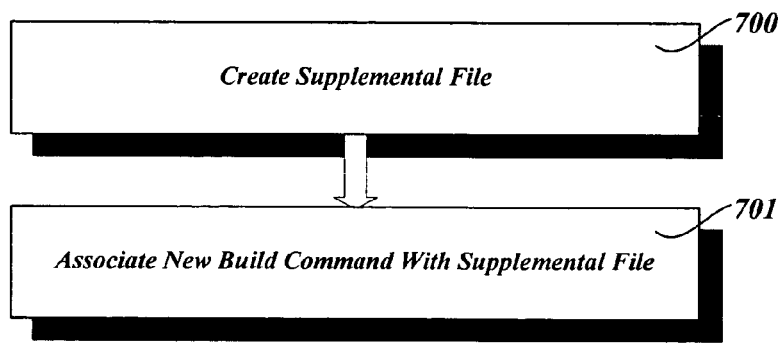
FIG. 7 illustrates a process of generating a new build command that build software according to a combination of the default properties and any additional or conflicting properties specified in a supplemental file.

The following detailed description will generally follow the summary of the invention, as set forth above, further explaining and expanding the definitions of the various aspects and embodiments of the invention as necessary. FIGS. 2a, 2b, and 2c provide a prior art computing and networked environment which will be recognized as generally suitable for use in connection with the systems and methods set forth herein. Because the material in FIGS. 2a, 2b, and 2c is generally known in the art, the corresponding description is reserved for the end of this specification, in the section entitled "exemplary computing and network environment." FIG. 3 and FIG. 4 present primary and supplemental files, which may be used to specify default and modified build properties, respectively. Next, FIG. 5 illustrates various embodiments of the invention adapted for use in collaborative development environments. Finally, FIG. 6 and FIG. 7 illustrate the creation of new build commands associated with various supplemental files.

Figure 1A:
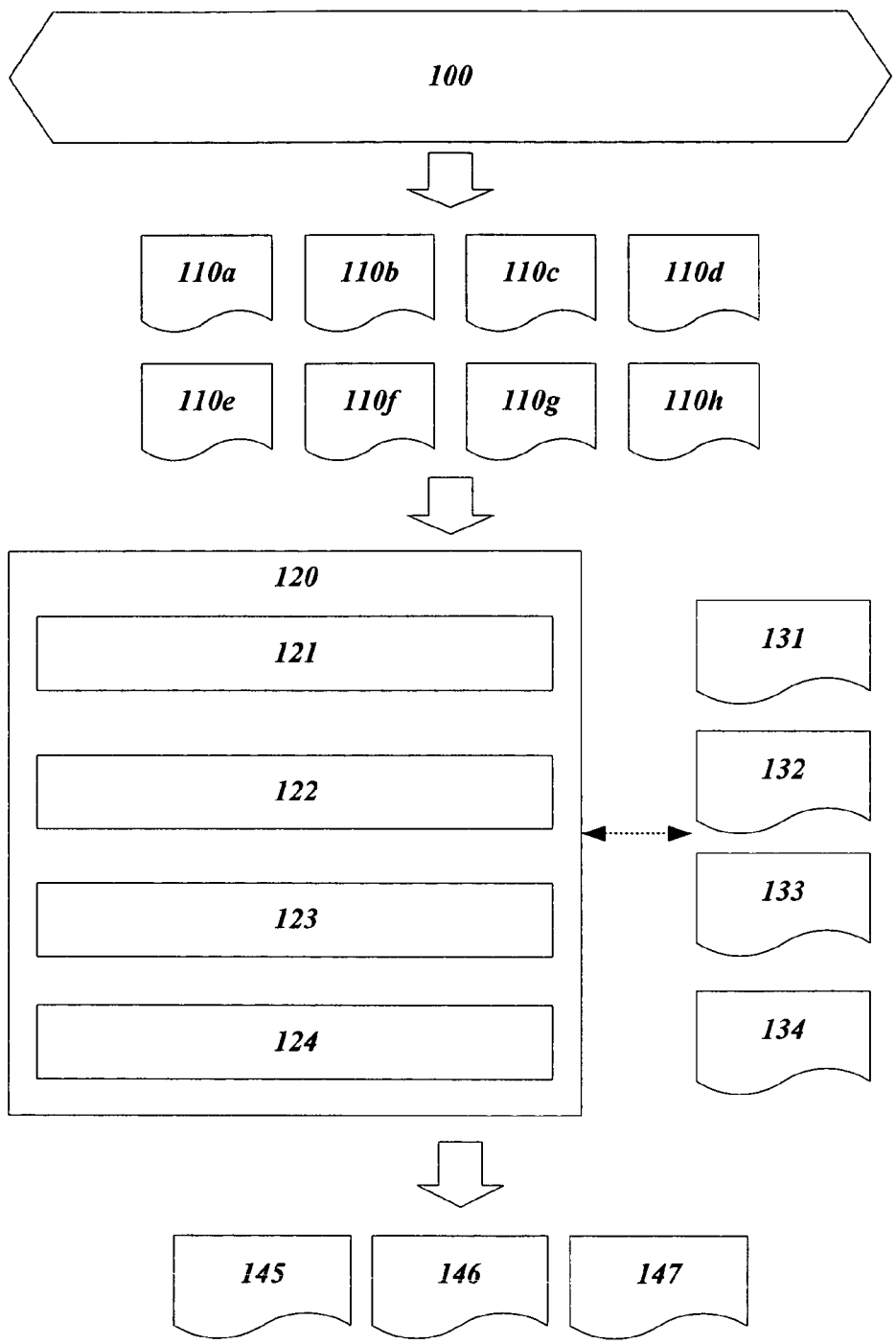
FIG. 1a illustrates the prior art software development process, in which a plurality of files are converted into executable files by a build process, and where the build process draws on a second set of files to determine various properties of the output computer executable files.

FIG. 3 presents many of the same elements, bearing the same identification numbers, as FIG. 1a. This illustrates that the various embodiments of the invention can operate in the context of an IDE that is known in the art. Thus, just as in FIG. 1a, FIG. 3 shows the process of developing software using an IDE. First, software can be designed using a design tool 100. The design tool 100 will typically provide a wide range of design functions for generating any number of different files 110a-110h. Files 110a-110h may be files of a variety of differing types. Some may be files containing source code, while others are files that specify other properties of the software under development. When the files 110a-110h for a software application are ready, they may be passed to a build process 120. Many IDEs have built-in build processes 120. While some IDE products may bifurcate the creation of the files 110a-110h and the build-process 120, others provide design and build as options through a single user interface.

The build process 128 in FIG. 3 may have some differences from the prior art build process 120 in FIG. 1. Note that while build process 128 can include the prior art sub-processes 121, 122, 123, 124, it may also include an additional process 125 designed to manage a the primary file 135 and any supplemental files 135a-135d of the invention.

The sub-processes 121, 122, 123, 124 may provide a plurality of options that allow a user to specify properties of the output executable files 145, 146, 147. For example, a user may wish to build executable files that are as small in disk size as possible. Other users may not care about disk size, and may care instead about performance. Properties of executable files 145, 146, 147 may be specified in the build process 128 and sub-processes 121, 122, 123, 124 to optimize performance. A host of other options allowing users to control the properties of executable files 145, 146, 147 are available in a typical build process, and may also be made available in 128. These properties may be stored in one or more files 131-134 available to the build process 120.

The properties specified for executable files 145, 146, 147 may be stored in a primary file 135. The primary file 135 can be a file identical to files 131-134, or can have features designed to facilitate combining the primary file 135 with supplemental files 135a-135d. The primary file 135 can specify any amount and variety of build properties for executable files 145, 146, 147. The properties stored in the primary file 135 can be considered the default properties for executable files 145, 146, 147. Default properties are those that are generally agreed on for one or more of the executable files 145, 146, 147. In the case of a development team working together, the determination of the default properties may be made by a group or individual with expertise in making the appropriate build property decisions. In the case of a solo developer, the default properties may be determined entirely by the solo developer. One advantage of the invention is that a single primary file 135 may be kept. The primary file 135 is not easily confused with supplemental files 135a-135d that specify different properties for one or more executable files 145, 146, 147.

The supplemental files 135a-135d can also contain a selection of build properties for one or more executable files 145, 146, 147. The supplemental files 135a-135d, like the primary file 135, can specify any amount and variety of build properties for executable files 145, 146, 147. In many situations, the supplemental files my specify somewhat fewer properties than the primary file 135, because the majority of the properties specified for executable files specify any amount and variety of build properties for executable files 145, 146, 147 need not be modified. However, a supplemental file 135a may contain as many or more property selections than a primary file 135.

The properties in a supplemental file 135a may be considered a "file delta" or a set of changes to the primary file 135. To suggest this concept, the supplemental files in FIG. 3 and FIG. 4 are depicted as triangles. In various embodiments, the properties in a supplemental file 135a can override any conflicting properties in a primary file 135. FIG. 4 illustrates the primary file 135 from FIG. 3 combined with the various supplemental files 135a-135d from FIG. 3. Consider the top combination in FIG. 4, that of primary file 135 and supplemental file 135a. The primary file 135 may provide an application under development with two hundred property selections. In a build of the application using only the primary file 135, all two hundred property selections will be implemented by the build process 128 from FIG. 3, and executable files 145, 146, 147 will reflect the selected properties. In a build using the exemplary primary file 135 and a supplemental file 135a, such as in the top line of FIG. 4, the set of properties selected for the build process 128 may be somewhat different. If supplemental file 135a contains a selection of ten properties, these ten properties may be used in addition to or instead of some of the two hundred properties in the primary file 135.

Similarly the various other supplemental files 135b-135d may contain various differing sets of modified properties. The combination of the primary file 135 with the various different supplemental files 135a, will lead to various different result sets, as reflected by the varying shapes of 140a-140d. Note that while the result sets may be stored in a new file such as 140a-140d, preferred embodiments of the invention will not keep such new files 140a-140d after a build using a given primary and supplemental file. This is because such new files 140a-140d could lead to confusion and proliferation of files in the development process. Instead, it is generally considered advisable to temporarily combine the properties of a primary and supplemental file.

Any number of means may be used to combine the properties of a supplemental file 135a and those of the primary file 135. In some embodiments, the primary file 135 can be designed to temporarily inherit the properties of the supplemental file 135a. In other embodiments an additional build process such as 125 can be used to combine the properties in a primary file 135 and a supplemental file 135a. There are a number of ways such a combination can be accomplished. For example, a new file could be temporarily generated using the properties from the primary and supplemental files. The new file could be discarded after the build. Alternatively, the primary file 135 could be temporarily altered by adding the properties of the supplemental file 135a, while saving the original state of the primary file so that it can be restored after the build.

Figure 1B:
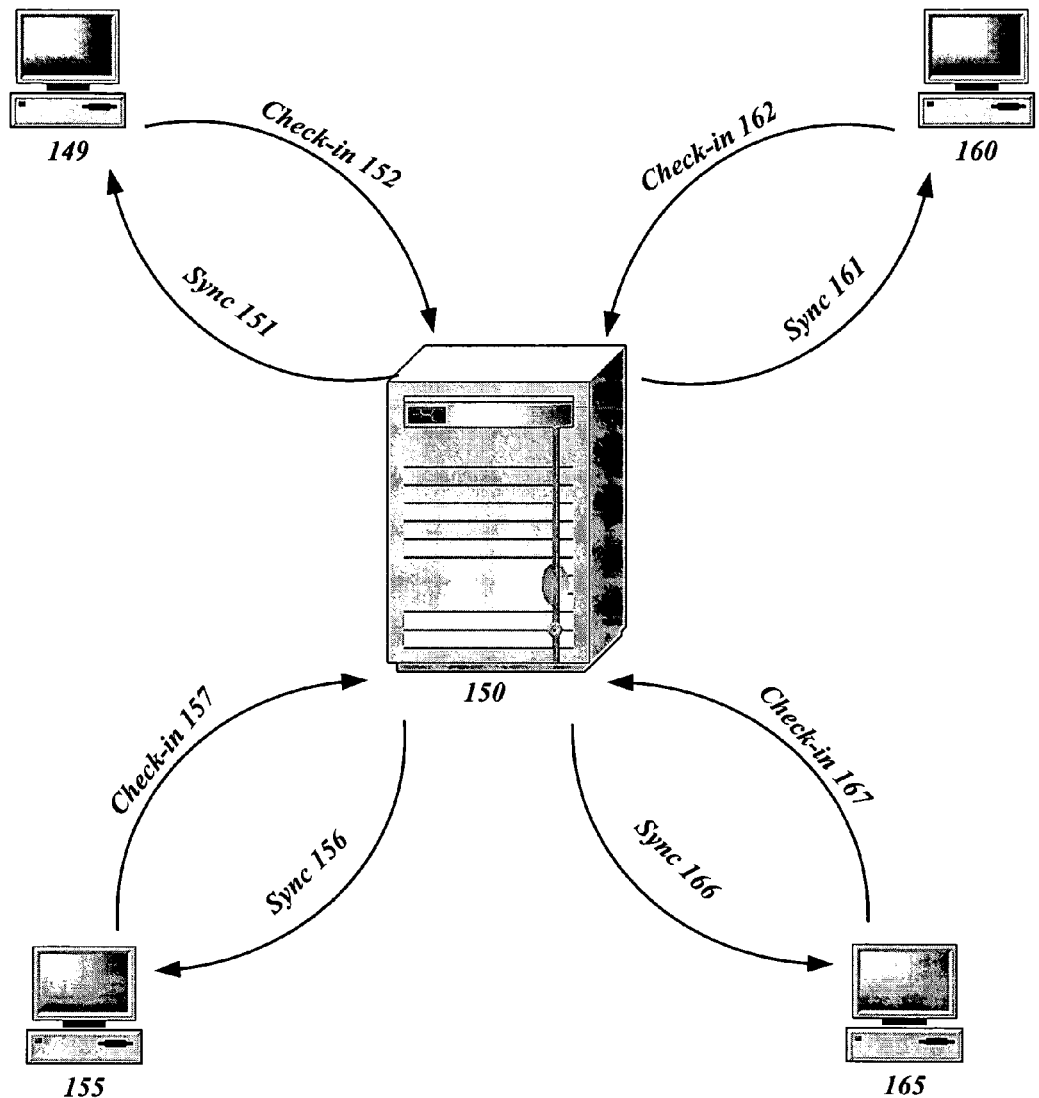
FIG. 1b illustrates a typical prior art collaborative software development environment, in which a plurality of software developers coordinate their efforts through a central server. Each developer may cause several builds of software under development for his or her own purposes, using different sets of build properties.

FIG. 5 illustrates a collaborative development environment that uses many of the same elements as FIG. 1b. As discussed with reference to FIG. 1b, a solo developer may run an IDE on a personal computer, or a team of developers may work together in a networked environment such as that of FIG. 4. As suggested by the FIG. 4, a central server 150 may be used to coordinate the efforts of a number of developers using client devices 149, 155, 160, 165. The developers may each have a variety of responsibilities in implementing aspects of a large software application. It is important that the various aspects of software work together properly. It is also preferable to ensure centralized control over a software application, so that developers cannot inadvertently alter the application without approval through the proper channels. Without such centralized control, the development environment can quickly become one in which there are many copies of an application, each with differing features, and it becomes impossible to move forward with production.

The means by which most central servers 150 coordinate development is through sync and check-in procedures, as described above. Often, a developer may build a copy of the software, or a portion of the software, on a personal machine, e.g. 149 for the purpose of determining if certain modifications to the software are adequate, measuring performance, and the like. One benefit of the invention is that in this scenario, a developer can store supplemental files 135a-135d locally. As illustrated in FIG. 5, each developer 149, 155, 160, and 160 has a locally stored supplemental file, while the primary file 135 is maintained on the central server 150. Various developers often have differing preferences in terms of which build properties to use, and the supplemental files 135a-135d may be kept according to personal preference. This configuration leaves no doubt as to the identity of the primary file 135, and does not risk replacement or alteration of the primary file 135.

In the case of the solo developer, both the primary and supplemental files may be stored on the same machine. This is a somewhat simpler scenario, but nonetheless a scenario in which the invention is helpful in managing build property files.

FIG. 6 provides an additional feature of the invention that may be used to provide easy access to various sets of build properties from the Graphical User Interface (GUI) of an IDE. Typically, a GUI will provide a menu item, such as 636, that gives a drop-down list providing a number of actions that may be initiated. Such a drop-down list, or, in other embodiments, a toolbar item or other selection vehicle, may be configured to provide a selection of build commands 642-646. The various build commands 642-646 can correspond to varying combinations of primary and default files. For example, a first build command 642 could be a default command that operates to build software with the properties specified in the primary file only. A second build command could build software with a combination of the properties in the primary file, and a selected supplemental file. Embodiments of the GUI may provide a selection of build commands based on the number of supplemental files available for a given software application or portion thereof under development. Such options may be made available automatically, or may be available based on some user action, as illustrated in FIG. 7.

FIG. 7 illustrates a sequence of user actions in generating a new build command for a GUI that builds software using a combination of a primary and supplemental file. First, the user can create the supplemental file by specifying any desired properties for the supplemental file 700. Next the user can associate a new build command with the supplemental file 701. Step 701 may also comprise associating the build command with a primary file, or this step may be undertaken automatically by the IDE or other development software.

Exemplary Computing and Network Environment

With reference to FIG. 2*a*, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

FIG. 2*b* illustrates a somewhat more detailed example of a suitable computing device from FIG. 2*a* and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2*b*, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2b, provide storage of computer readable instructions, data structures, program modules and other data for the computer 241. In FIG. 2b, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2b illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 2c. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2c provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2c, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A method for building at least one computer executable file, comprising:
   receiving a request to build the at least one computer executable file according to build properties specified in a first file in combination with build properties specified in a second file, wherein the build properties govern how to build each of the at least one computer executable file;
   reading the first file, wherein the first file specifies a plurality of first build properties for the at least one computer executable file;
   reading the second file, wherein the second file specifies at least one second build property of the at least one computer executable file that is not specified in the first file, and wherein the at least one second build property temporarily overrides at least one of the plurality of first build properties;
   maintaining said first build properties overridden by said second build properties during the building of the at least one computer executable file;
   building the at least one computer executable file according to a combination of the plurality of first build properties and the at least one temporarily overriding second build property; and
   storing the at least one computer executable file in a computer readable storage medium.

2. The method of claim 1, wherein the first file inherits the second file.

3. The method of claim 1, further comprising ensuring that the first file is restored after said building such that subsequent building will not repeat reading the second file unless a subsequent request specifies said first file and said second file.

4. The method of claim 1, wherein said receiving a request preceded by selecting a command in a Graphical User Interface (GUI), and wherein said command is associated with said first file and said second file.

5. The method of claim 4, wherein said GUI is for an Integrated Development Environment (IDE).

6. The method of claim 1, wherein the first file is located on a server that is coupled with a plurality of clients in a collaborative software development environment.

7. A computer readable storage medium bearing instructions for building at least one computer executable file, comprising:
   instructions for receiving a request to build the at least one computer executable file according to build properties specified in a first file in combination with build properties specified in a second file, wherein the build properties govern to build each of the at least one computer executable file;
   instructions for reading the first file, wherein the first file specifies a plurality of first build properties of the at least one computer executable file;
   instructions for reading the second file, wherein the second file specifies at least one second build property of the at least one computer executable file that is not specified in the first file, and wherein the at least one second build property temporarily overrides at least one of the plurality of first build properties;
      instructions for maintaining said first build properties overridden by said second build properties during the building of the at least one computer executable file;
   instructions for building the at least one computer executable file according to a combination of the plurality of first build properties and the at least one temporarily overriding second build property.

8. The computer readable storage medium of claim 7, wherein the first file inherits the second file.

9. The computer readable storage medium of claim 7, further comprising instructions for ensuring that the first file is restored after said building such that subsequent building will not repeat reading the second file unless a subsequent request specifies said first file and said second file.

10. A method for generating computer executable files, comprising:
   reading at least one first file;
   generating a computer executable file from said at least one first file;
   reading at least one second file comprising a first plurality of selected build properties for the computer executable file, wherein said at least one second file inherits a second plurality of selected build properties, and wherein said second plurality of selected build properties overrides any conflicting build properties in said at least one second file, and wherein the combined build properties govern how to build each of the at least one computer executable file;
      maintaining said first build properties overridden by said second build properties during the building of the at least one computer executable file;
   using at least a subset of said a first plurality of selected build properties and said second plurality of selected build properties in generating an updated computer executable file; and
   storing the computer executable file in a computer readable storage medium.

11. The method of claim 10, further comprising restoring said second file after said using such that the second file may be re-used without inheriting the second plurality of selected build properties.

12. The method of claim 10, further comprising associating said using with a command in a Graphical User Interface (GUI) such that selection of the command triggers said generating a computer executable file using at least a subset of said a first plurality of selected build properties and said second plurality of selected build properties.

13. The method of claim 12, wherein said GUI is for an Integrated Development Environment (IDE).

14. The method of claim 10, wherein the second file is located on a server that is coupled with a plurality of clients in a collaborative software development environment.

15. A computer system configured to render a Graphical User Interface (GUI) that depicts a plurality of options for building software, the computer system comprising:
   hardware for generating a first selectable menu item for building at least one executable file, wherein said building converts at least one first file into said executable file; and wherein
   said building further comprises retrieving a set of build properties for said at least one executable file; and wherein
   said set of build properties is a combination of build properties in a second file and a third file, and the build properties in said third file override the build properties in said second file and said set of build properties govern how to build each of the at least one computer executable file, and maintaining said build properties in said second file overridden by said build properties in said third file during the building of the at least one computer executable file.

16. The computer system of claim 15, further comprising a second selectable menu item for building at least one second executable file, wherein building at least one second executable file involves the second file and a fourth file, and wherein build properties specified in said fourth file override the build properties in said second file.

17. The computer system of claim 15, wherein said GUI is for an Integrated Development Environment (IDE).

18. The computer system of claim 15, wherein the second file is located on a server that is coupled with a plurality of clients in a collaborative software development environment.

19. The computer system of claim 15, wherein the second file inherits the third file.

20. The computer system of claim 15, further comprising at least one second selectable menu item for generating a new menu item, wherein said new menu item builds computer executable files with a combination of build properties from said second file and at least one new file.

21. A computer readable storage medium bearing instructions for displaying a Graphical User Interface (GUI) providing a plurality of options for building software, comprising:
   instructions for displaying a first selectable menu item for building at least one executable file, wherein said building converts at least one first file into said executable file; and wherein
   said building further comprises retrieving a set of build properties for said at least one executable file; and wherein
   said set of build properties is a combination of build properties in a second file and a third file, and the build properties in said third file override the build properties in said second file, and said set of combined build properties govern how to build each of the at least one computer executable file, and maintaining said build properties in said second file overridden by said build properties in said third file during the building of the at least one computer executable file.

22. The computer readable storage medium of claim 21, wherein said GUI is for an Integrated Development Environment (IDE).

23. The computer readable storage medium of claim 21, wherein the second file inherits the third file.

24. The computer readable storage medium of claim 21, further comprising instructions for displaying at least one second selectable menu item for generating a new menu item, wherein said new menu item builds computer executable files with a combination of build properties from said second file and at least one new file.

* * * * *